United States Patent [19]

Omori et al.

[11] Patent Number: 4,937,802
[45] Date of Patent: Jun. 26, 1990

[54] MAGNETIC HEAD DRIVE CIRCUIT

[75] Inventors: Takashi Omori; Kazuhiko Fujiie, both of Tokyo, Japan

[73] Assignee: Sony Corporation, Tokyo, Japan

[21] Appl. No.: 234,190

[22] Filed: Aug. 19, 1988

[30] Foreign Application Priority Data

Aug. 19, 1987 [JP] Japan .................................. 62-104095

[51] Int. Cl.$^5$ ........................ G11B 11/12; G11B 13/04
[52] U.S. Cl. ..................................... 369/13; 360/114; 363/98
[58] Field of Search ..................... 369/13; 360/59, 114; 365/122; 363/98, 17, 63, 43; 323/282

[56] References Cited

U.S. PATENT DOCUMENTS

| | | | |
|---|---|---|---|
| 4,467,407 | 8/1984 | Asano | 363/43 |
| 4,651,269 | 3/1987 | Matsumura | 363/63 |
| 4,748,605 | 5/1988 | Sakai et al. | 369/13 |
| 4,750,159 | 6/1988 | Yoda | 369/13 |

OTHER PUBLICATIONS

Japanese Abstract, vol. 12, No. 331, Sep. 7, 1988, "Magnetic Head Driving Circuit 63-94406 (A) by Sony Corporation".

Japanese Abstract vol. 12, No. 295, Aug. 11, 1988, "Magnetic Recording Circuit 63-69005".

Primary Examiner—Steven L. Stephan
Assistant Examiner—Hoa Nguyen
Attorney, Agent, or Firm—Hill, Van Santen, Steadman & Simpson

[57] ABSTRACT

A magnetic head drive circuit for driving a coil of the magnetic head performing opto-magnetic recording, is disclosed. According to the present invention, the switching elements are actuated on the basis of driving signals for commutatingly connecting three power sources presenting three different potentials to both ends of a coil of the magnetic head such that the potential difference across both ends of the coil at the time of magnetic field inversion is larger than that at the time of generation of the stationary magnetic field to render the rise time of the current flowing in the coil sufficiently short.

10 Claims, 13 Drawing Sheets

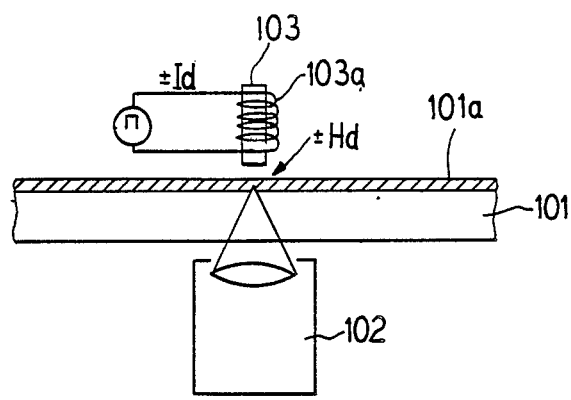
FIG. 1
FIG. 2A
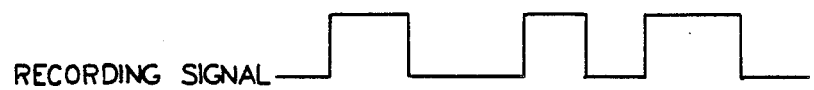
RECORDING SIGNAL
FIG. 2B
CURRENT
FIG. 2C
MAGNETIC FIELD RECORDING SIGNAL (Sig) (H)(L)

CONTROL SIGNAL (Sa) (H)

CONTROL SIGNAL (Sb) (H)

Va

Vb

Iab (f)

Iab

Irc

FIG. 7A Sig 0
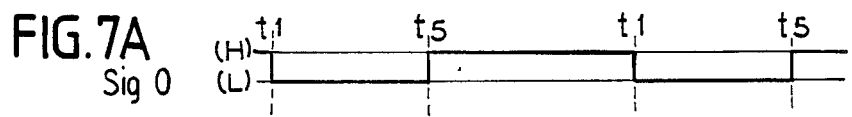
FIG. 7B CK
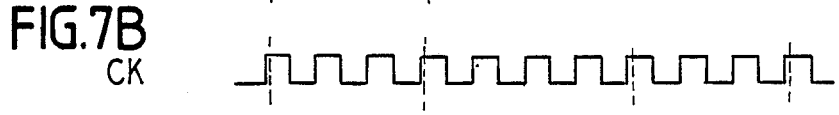
FIG. 7C Sig 1
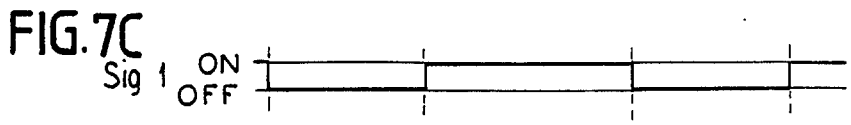
FIG. 7D Sig 2
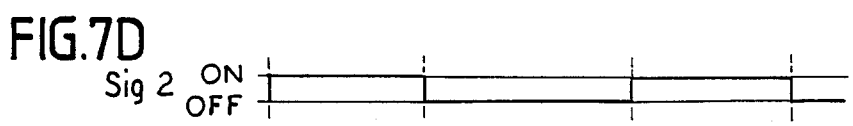
FIG. 7E Sig 3
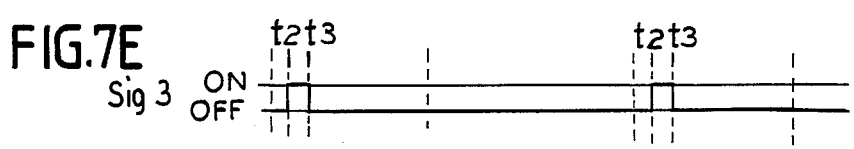
FIG. 7F Sig 4
FIG. 7G Sig 5
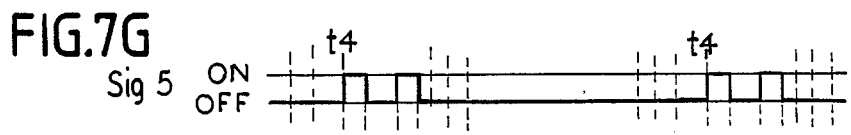
FIG. 7H Sig 6
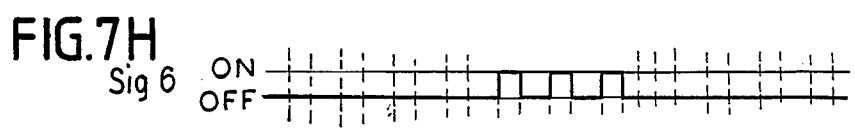
FIG. 7I Va
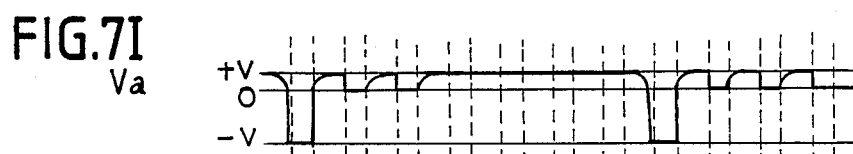
FIG. 7J Vb
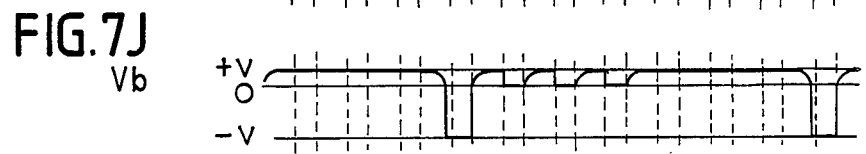
FIG. 7K Iab
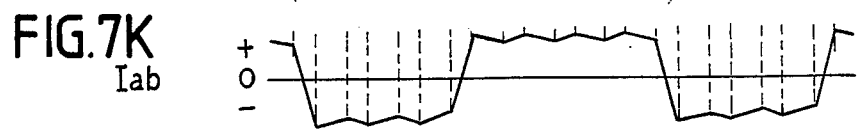

FIG. 9A Sig 0 (Sig 1)
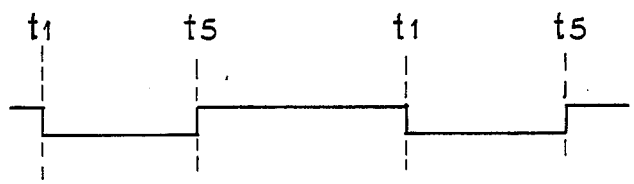
FIG. 9B CK
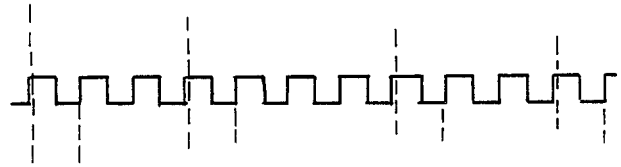
FIG. 9C OUTPUT OF F.F.
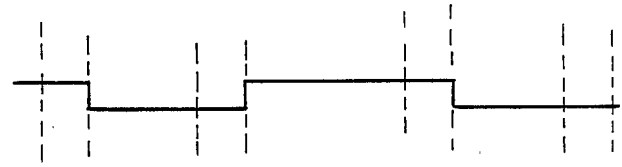
FIG. 9D $\overline{\text{Sig 0}}$ (Sig 2)
FIG. 9E FALL EDGE DET.
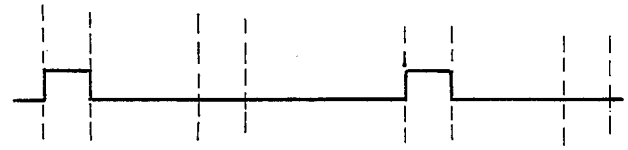
FIG. 9F OUTPUT OF F.F.
FIG. 9G RISE EDGE DET.
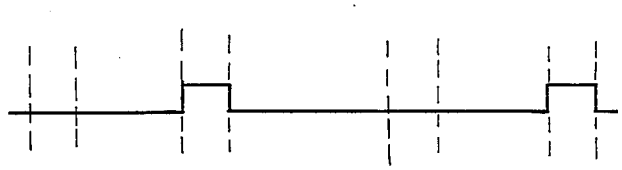

FIG. 9H OUTPUT OF FIRST DELY
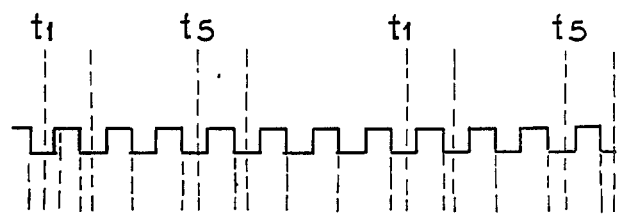
FIG. 9I OUTPUT OF SECOND DELY
FIG. 9J REFERENCE PULSE
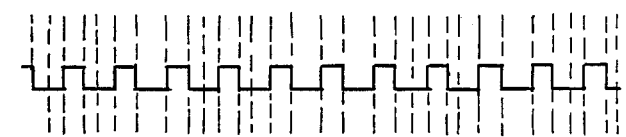
FIG. 9K Sig 3
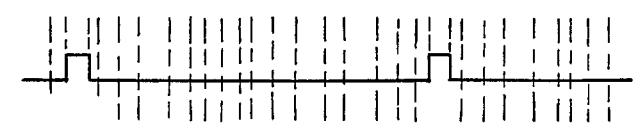
FIG. 9L Sig 4
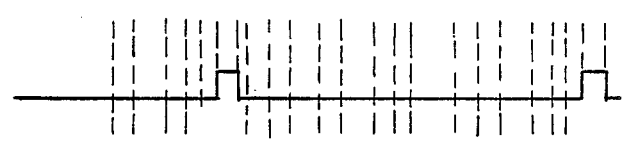
FIG. 9M Sig 5
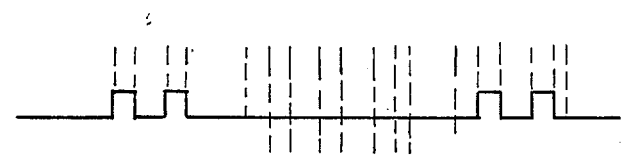
FIG. 9N Sig 6
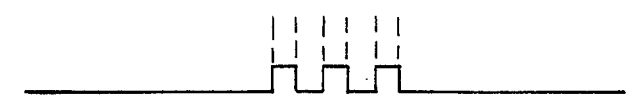

Sig 0

CK

Sig 1  ON / OFF

Sig 2  ON / OFF

Sig 3  ON / OFF

Sig 4  ON / OFF

Sig 5  ON / OFF

Sig 6  ON / OFF

Sig 6 ON/OFF $V_A$ $V_B$ $V_C$ $I_{AB}$

MAGNETIC HEAD DRIVE CIRCUIT

PRIOR ART

This invention relates to a magnetic head drive circuit for driving a magnetic head for effecting opto-magnetic recording.

There has been provided an opto-magnetic disk making information rewriting possible. As a method for recording the information on the opto-magnetic disk, there has been proposed a method by magnetic field modulation which makes so-called overwriting possible, as shown for example in FIG. 1. With this method, a perpendicular magnetization film 101a of an opto-magnetic disk 101 is irradiated with a constant laser beam emanating from an optical pickup 102 to elevate the temperature of the perpendicular magnetization film 101a to higher than the curie temperature. The magnetic field induced by a magnetic head 103 is modulated by recording signals so that magnetic patterns associated with the patterns of changes of said magnetic field are left over on the perpendicular magnetization film 101a for recording the information.

When recording by the magnetic field modulation system, with the rectangular recording signals as shown at A in FIG. 2, the current flowing in a coil 103a of the magnetic head 103 has an integrated waveform having a certain time constant, as shown at B in FIG. 2. The magnetic field produced by the magnetic head 103 has an integrated waveform approximately the same as that of the current waveform, as shown at C in FIG. 2. In the drawing, Id and Hd denote the driving current and the intensity of the associated magnetic field, respectively.

In general, when recording with the magnetic field modulation system, it is necessary that the magnetic field produced by the magnetic head be of an intensity required for recording and that the rise time of the magnetic head and hence that of the current be sufficiently short. As an example, it is assumed that the drive circuit as shown in FIG. 3 is employed, wherein the intensity of the magnetic field Hd is 200 e, the rise time t is 0.1 s, the drive current Id is 1A, and the inductance of the coil 104 of the magnetic head is 5 H. With the inductance L of the coil 104 of the magnetic head and the resistance R of the resistor 105, the rise time t is given by the formula t=L/R, it being assumed that the rise time t is equal to the time constant.

By substituting the aforementioned condition t=0.1 s and L=5 H in the above formula, the resistance R is found to be equal to 50 ohms. Hence, the drive voltage Vd supplied by the voltage source 106 is $$Vd = 1(A) \times 50(ohms) = 50V$$

so that the power consumption amounts to a larger value of 50 W.

Therefore, if the rise time is to be shorter sufficiently, the power consumption is inconveniently increased.

Thus, with a view to providing a magnetic drive head circuit having a sufficiently short rise time of the current flowing in the magnetic head coil, and a lower power consumption, there has been proposed in the Japanese Patent Application No. 238679/1986 assigned to the present Applicant a magnetic head driving circuit comprising a d.c. source adapted to supply current to a coil of a magnetic head performing an opto-magnetic recording, ar least two switching elements turned on and off by recording signals, and an auxiliary coil positioned between the d.c. source and the coil of the magnetic head and having an inductance sufficiently larger than the inductance of the magnetic head coil, wherein the switching elements are alternately turned on and off for switching the sense of the current flowing in the magnetic head coil.

An illustrative embodiment of the conventional magnetic head drive circuit is explained by refering to FIG. 4.

In this figure, the one end or point a of a head coil 91 is connected via auxiliary coil 92 to a power source 93, while being grounded via switching element 94. The other end of the head coil 91 or point b is connected via auxiliary coil 95 to the power source 93, while being grounded via switching elemet 96. Each of the auxiliary coils 92 and 95 has an inductance sufficiently larger than that of the head coil 91.

A signal input terminal 97 is connected to the switching element 96 while being connected via inverter 98 to the switching elemnt 94. The opening and closure of these switching elements 94 and 96 are controlled by recording signals Sig supplied to the signal input terminal 97, such that, when one of the switching elements causes the one end of the head coil 51 to be grounded, the other switching element isolates the other end of the head coil 91 from the ground.

In the above described magnetic head driving circuit, when the digital recording signal Sig composed of a high level (H) component and a low level (L) component as shown at A in FIG. 5 is supplied to the signal input terminal 97, the switching element 94 is controlled by a control signal which is a replica of the recording signal Sig inverted by the inverter 98, as shown at B in FIG. 5, such that, when the control signal is at a high (H) level, the one end of the head coil 91 is grounded. The switching element 96 is also controlled by a control signal shown at C in FIG. 5 and which is a replica of the recording signal Sig, such that, when the control signal is at a high (H) level, the other end of the head coil 91 is grounded.

By the operation of the switching elements 94 and 96, brought about by the recording signal Sig, the current supplied from the source 93 flows from the one end or point a to the other end or point b of the head coil 91 or vice versa to the ground. It is noted that, at the moment of switching of the switching elements 94 and 96, or of inversion of the magnetic field of the head coil 91, there is induced in the auxiliary coil 92 a high voltage Va shown at D in FIG. 5 at the one end or point a of the head coil 51 or a high voltage Vb shown at E in FIG. 5 at the other end or point b of the head coil 91.

Hence, the current Iab shown at F n FIG. 5 flows in the head coil 91.

However, in the above described head drive circuit, the current flowing in the head coil 91 at the time of the generation of the stationary magnetic field is fluctuated considerably as whown at F, f in FIG. 5, resulting in worsening of the recording characteristics. It is therefore necessary to render the current during the generation of the stationary magnetic field constant by the use of a waveform shaping circuit.

For example, as shown by broken lines in FIG. 4, a waveform shaping circuit consisting of a series connection of a resistor 99 and a capacitor 100 is connected in parallel with the head coil 91 and the current is caused to flow through the resistor 99 and the capacitor 100 as shown at G in FIG. 13, so that the current Iab' shown at FIG. 13 having good recording characteristics is produced at the head coil 91.

However, with the use of the above described waveform shaping circuit, the resistor 99 consumes a large amount of electric power so that power consumption is increased with the resulting heat evolution and hence the provision of special heat radiation means is necessitated to dissipate the evolved heat.

OBJECTS AND SUMMARY OF THE INVENTION

It is therefore a principal object of the present invention to provide a magnetic head drive circuit whereby opto-magnetic recording with good recording characteristics may be accomplished without the necessity of connecting a waveform shaping circuit component, including a resistor, in parallel with the head coil.

It is another object of the present invention to provide a magnetic head driving circuit wherein the potential difference between both ends of the head coil at the time of inversion of the magnetic field becomes larger than the same potential difference at the time of generation of the stationary magnetic field.

It is a further object of the present invention to provide a magnetic head drive circuit which consumes only lesser electric power.

According to the present invention there is provided a magnetic head drive circuit comprising three power sources presenting respective different potential for supplying the current to a coil of a magnetic head adapted for performing an opto-magnetic recording, a switching element adapted for commutationaly connecting each of said power source to one end of said coil, and a switching element adapted for commutatingly connecting each of said power sources to the other end of said coil, each of said switching elements being actuated on the basis of a recording signal and said power sources presenting the respective different potentials being commutatingly connected to both ends of said coil so that a potential difference is applied across both ends of said coil at the time of magnetic field inversion which is larger than the potential difference at the time of generation of the stationary magnetic field.

The above and other objects as well as novel features of the present invention will become more apparent from the specification and the claims especially when read in conjunction with the accompanying drawings.

BRIEF DESCRIPTION OF THE DRAWINGS

FIG. 1 is a diagrammatic view for understanding the magnetic field modulation system for performing opto-magnetic recording.

FIG. 2, consisting of (A)–(C), is a time chart for understanding the magnetic field modulation system shown in FIG. 1.

FIG. 7, consisting of (A)–(K), is a time chart for understanding the operation of the first embodiment of the magnetic head driving circuit.

FIG. 9, consisting of (A)–(N), is a time chart for understanding the operation of the control signal generating circuit.

DETAILED DESCRIPTION OF THE INVENTION

Figure 3:
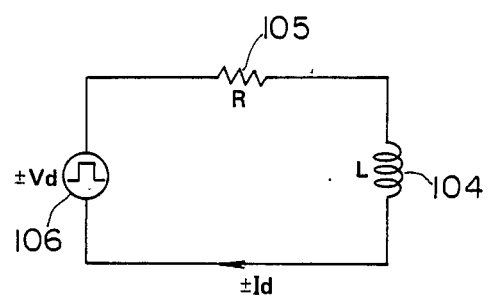
FIG. 3 is a circuit diagram showing the prior-art example of the magnetic head drive circuit.
Figure 4:
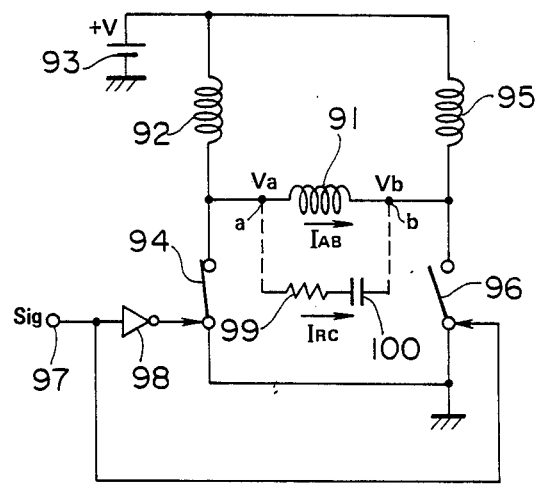
FIG. 4 is a circuit diagram showing the construction of the magnetic head drive circuit according to the assignee's conpending patent application.
Figure 5A:
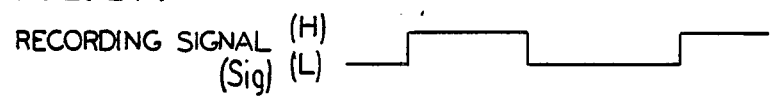
FIG. 5, consisting of (A)–(H), is a time chart for understanding the operation of the magnetic head drive circuit.
Figure 5B:
Figure 5C:
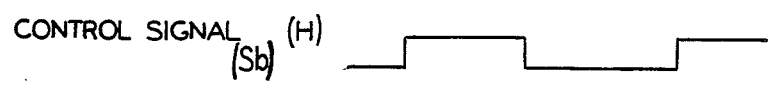
Figure 5D:
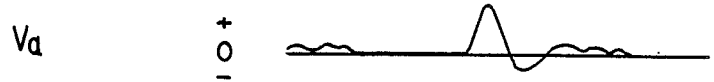
Figure 5E:
Figure 5F:
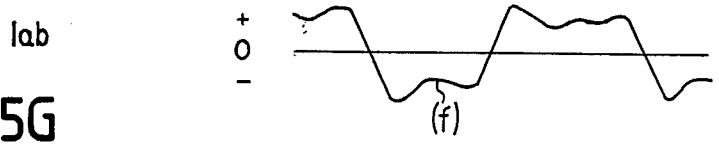
Figure 5G:
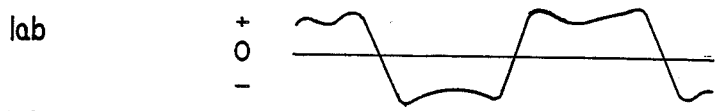
Figure 5H:
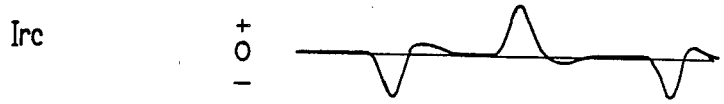

By referring to the drawings, preferred illustrative embodiments of the present invention will be explained in detail hereinbelow.

Figure 6:
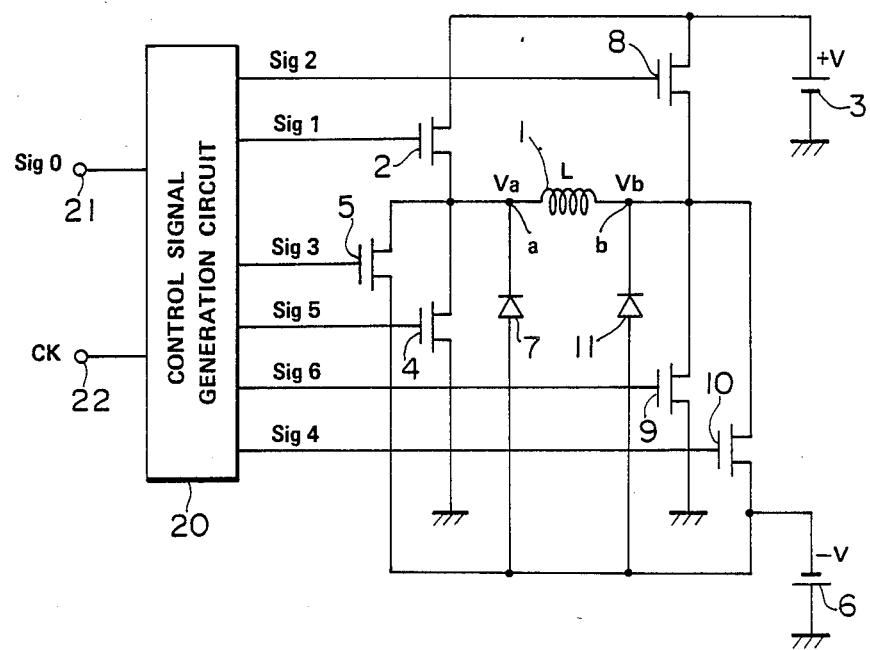
FIG. 6 is a circuit diagram showing the construction of a magnetic head driving circuit according to a first embodiment of the present invention.

FIG. 6 shows a magnetic head driving circuit according to a first embodiment of the present invention.

Referring to this figure, a head coil 1 is a coil of a magnetic head adapted to perform opto-magnetic recording by the magnetic field modulation system, and has an inductance L.

The one end or point a of the head coil 1 is connected via switchiing element 2 to the positive d.c. source 3, while being connected to the ground via switching element 9. The one end or point a of the head coil 1 is connected via switching element 5 directly and via diode 7 to a negative d.c. source 6.

The other end or point b of the head coil 1 is connected via switching element 8 to the positive d.c. source 3, while being grounded via switching element 9. The other end or point b of the head coil 1 is connected via switching element 10 directly and via diode 11 to the negative d.c. source 6.

Each of the switcing elements 2, 4, 5, 8, 9 and 10 has its control input end connected to a control signal generating circuit 20. To this circuit 20 are connected a signal input terminal 21 and a clock pulse input terminal 22.

It will be noted that the potential difference between the positive d.c. source 3 and the negative d.c. source 6 is very large and, for example, the potential (+V) of the d.c. source 3 is about +5 to 10 V, whereas the potential (−V) of the d.c. source 6 is about −50 to −100 V. In the present embodiment, the ground potential is used as the 0 (V) potential source.

The operation of the magnetic head drive circuit of the first embodiment is explained by referring to the time chart shown in FIG. 7.

The control signal generating circuit 20 generates control signals Sig 1 to Sig 6 for the switching elements 2, 8, 5, 10, 4 and 9 shown at C to H in FIG. 7, from a digital recording signal Sig 0 shown at A in FIG. 7, supplied to a signal input terminal 21, which signal rises at the timing $t_1$ and falls at the timing t, and a clock pulse CK shown at B in FIG. 7, supplied to a clock pulse input terminal 22, by a signal processing as later described.

The control signal Sig 1 for the switching element 2 is a signal which is a replica of the recording signal Sig 0, while the control signal Sig 2 for the switching element 8 is a signal having the opposite polarity to the recording signal Sig 0. The control signal Sig 3 for the switching element 5 is a pulse signal which goes high (H) for one pulse interval for each falling of the recording signal Sig 0. The control signal Sig 4 for the switching element 10 is a pulse signal which goes high (H) for one pulse interval for each rising of the recording signal Sig 0. The control signal Sig 5 for the switching element 4 is a pulse signal having a number of pulses corresponding to the low (L) level width of the recording signal Sig 0, while the control signal Sig 6 for the control element 9 is a pulse signal having a number of pulses corresponding to the high (H) level width of the recording signal Sig 0.

The switching elements 2, 8, 5, 10, 4 and 9 are turned on each time the control signal Sig 1 to Sig 6 goes high (H) to complete the circuit.

Directly before the falling of the recording signal Sig 0, that is, directly before the timing $t_1$ in FIG. 7, the switching element 2, to which the control signal Sig 1 is supplied, is turned on, with the remaining switching elements 8, 5, 10, 4 and 9 being turned off. At this time, the potential Va at the one end or point a of the head coil 1 is $+V$, as shown at I in FIG. 7, by the position d.c. source 3 to which the point a is connected via switching element 2. The potential Vb at the other end or point b of the head coil 1 is in the course of rising to $+V$, as shown at J in FIG. 7, since the charges at the point a will flow thereto via head coil 1.

As the switching element 2, to which the control signal Sig 1 is supplied, is turned off and the switcing element 8, to which the control signal Sig 2 is supplied, is turned off, with the falling of the recording signal Sig 0, that is, at the timing $t_1$ shown in FIG. 7, the potential Vb at the point b is $+V$ by the positive d.c. source 3 to which it is connected via switching element 8. Since the switching element 2 is turned off and hence the charges are no longer supplied by the positive d.c. source 3 to the point a, while the charges are shifted from the point a to the point b as a result of the flyback of the inductance L of the head coil 1, the potential Va at the point a is decreased acutely. Since it is the potential difference caused by the inductance L, the current Iab of the head coil 1 is not changed as shown at K in FIG. 7. When the lowering of the potential Va at the point a reaches $-V$, the diode 7 is turned on and the potential of the point a is stabilized ar $-V$ by the negative d.c. source 6.

Also the potential a is fixed at $-V$ by the negative d.c. source 6, since the switching element 5, to which the control signal Sig 3 is supplied, is turned on ar the timing of $t_2$.

At the rise time of the recording signal Sig 0, that is, at the time of inversion of the magnetic field of the magnetic head at the timing $t_5$ shown in FIG. 7, the switching element 8 supplied with the control signal Sig 2 performs the same operation as that of the switching element 2, the switching element 10 supplied with the control signal Sig 4 performs the same operation as that of the switching element 5 and the diode 11 performs the same operation as that of the diode 7. Hence, the operation of the magnetic head during magnetic head inversion with the rising of the recording signal Sig 0, that is, at the timing $t_5$ in FIG. 7 is similar to that of the magnetic head during magnetic field inversion with the falling of the recording signal Sig 0, that is, at the timing $t_1$ shown in FIG. 7.

That is, during the inversion of the magnetic field of the magnetic head, a large potential is produced across the both ends of the head coil 1 due to the potential $+V$ supplied by the positive d.c. source 3 and the potential $-V$ supplied by the negative d.c. source 6, so that the sense of the current Iab flowing in the head coil 1 can be changed in a sufficiently short rise time.

The operation of the magnetic field during the generation of the stationary magnetic field, with the recording signal Sig 0 at the low (L) level, will be explained.

When the switching element 5, to which the control signal Sig 3 is supplied, is turned off at the timing $t_3$, electrical charges are moved from the point b to the point a by the flyback of the inductance L of the head coil 1, so that the potential Va at the point a approaches promptly to $+V$. From this time on, the current Iab flowing in the head coil 1 is decreased gradually. When the switcing element 4 supplied with the control signal Sig 5 is turned on at the timing $t_4$, the point a is grounded, the above current Iab being again increased at a gradient associated with the potential difference across both ends of the head coil 1. By optimizing the operational timing of the switching element 4, the current Iab flowing in the head coil 1 can be maintained at a substantially constant level.

Since the switching element 10 to which the control signal Sig 4 is supplied performs the same operation as that of the switching element 5, and the switching element 9 to which the control signal Sig 6 is supplied performs the same operation as that of the switching element 4, the operation of the magnetic head during the time of generation of the stationary magnetic field with the recording signal Sig 0 at the high (H) level is similar to that or the magnetic head during the time of generation of the stationary magnetic head with the recording signal Sig 0 at the low (L) level.

That is, during the time of generation of the stationary magnetic field of the magnetic head, the head coil 1, the one end of which, that is, point a or point b, is supplied with the potential $+V$ from the aforementiond d.c. source 3, has its other end, that is, point b or point a, periodically grounded, so that a potential difference is produced across both ends of the head coil 1 for producing the approximately constant current Iab in the head coil 1.

Hence the magnetic head drive circuit is designed to produce a larger potential difference across both ends of the head coil 1 during inversion of the magnetic field of the magnetic head, which is due to the potential $+V$ supplied by the positive d.c. source 3 and the potential $-V$ supplied by the negative d.c. source 6, and a potential difference across both ends of the head coil 1 during generation of the stationary magnetic field of the magnetic head, which is due and the potential due to the ground potential, with the result that the rise time of the current flowing in the head coil 1 may be sufficiently shortened and the power consumption reduced without the necessity of connecting a waveform shaping circuit component, such as a resistor, in parallel with the head coil 1.

It will be noted that FET's or transistors may be used as the switching elements and the diodes 7 and 11 can be omitted by the parasitic diodes especially when the FET's are employed as the switching elements 5 or 10.

Figure 8:
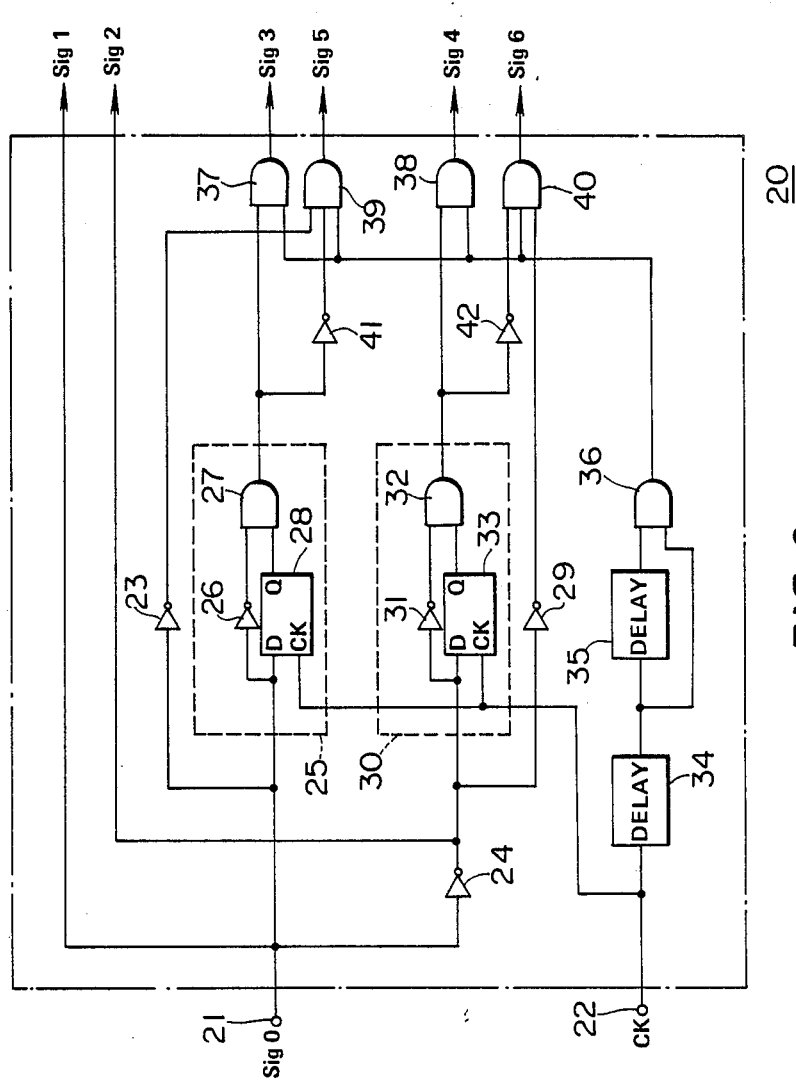
FIG. 8 is a circuit diagram showing the construction of a control signal generating circuit employed in the first embodiment of the magnetic head driving circuit.

FIG. 8 shows the control signal generating circuit 20.

In this figure, there are supplied to the control signal generating circuit 20 a digital recording signal Sig 0 shown at A in FIG. 9 via signal input terminal 21, which signal Sig 0 falls at the timing $t_1$ and rises at the timing $t_5$, similarly to the recording signal Sig 0 shown in FIG. 7, and a clock pulse CK shown at B in FIG. 7 via clock pulse input terminal 22.

The recording signal Sig 0 is outputted from the control signal generating circuit 20 as the aforementioned control signal Sig 1, while being simultaneously supplied to inverters 23, 24 and to a falling detection circuit 25. The clock pulse CK is supplied to falling detection circuits 25 and 30 and to a first delay circuit 34.

The rising detection circuit 25 is composed of an inverter 26, an AND gate 27 and a D-type flip-flop 28. The flip-flop 28 forms an output signal shown at C in FIG. 9, from the aforementioned recording signal Sig 0 and clock pulse CK, to supply the output signal to an input end of the AND gate 27. This AND gate 27 in turn forms, from the output signal of the flip-flop 28 and a negation signal of the aforementioned recording signal Sig 0, shown at D in FIG. 9, supplied from the inverter 26, a falling detection signal, shown at E in FIG. 9, rising at the falling timing $t_1$ of the recording signal Sig 0.

The negation signal of the aforementioned recording signal Sig 0, shown at D in FIG. 9, outputted from the inverter 24, is outputted as the control signal Sig 2 from the control signal generating circuit 20, while being simultaneously supplied to the inverter 29 and to the falling detection circuit 30.

Similarly to the falling detection circuit 25, the falling detection circuit 30 is composed of an inverter 31, an AND gate 32 and a D-type flip-flop 33. The flip-flop 33 forms an output signal, shown at F in FIG. 9, from the aforementioned negation output of the recording signal Sig 0 and clock pulse CK, to supply an output signal to an input of the AND gate 32. The AND gate 32 in turn forms and outputs a rising detection signal shown at G in FIG. 9 from the output signal of the flip-flop 33 and the aforementioned recording signal Sig 0, shown at A in FIG. 9, supplied from the inverter 31, which rising detection signal rises at the timing $t_5$ of falling of the negation signal of the recording signal Sig 0, that is, of rising of the recording signal Sig 0.

The first delay circuit 34 causes the clock pulse CK to be delayed to form a signal shown at H in FIG. 9 to supply the signal to a second delay circuit 35 and to an AND gate 36. The second delay circuit 35 causes a signal supplied from the first delay circuit 35 to be delayed to supply a signal shown at I in FIG. 9 to the aforementioned AND gate 36. This AND gate 36 outputs a logical output of the aforementioned delayed clock pulses, which logical output, shown at J in FIG. 9, represents a reference pulse governing the periods of the aforementioned control signals Sig 3 to Sig 6.

The output of the inverter 23 is supplied to an AND gate 39. The output of the falling detection circuit 25 is supplied to an AND gate 37 while being supplied via inverter 41 to the AND gate 39.

The output of the inverter 25 is supplied to an AND gate 40. The output of the falling detection circuit 30 is supplied to the AND gate 38, while being supplied via inverter 42 to the aforementioned AND gate 40.

The output of the AND gate 36 is supplied to the aforementioned AND gate 37, 38, 39 and 40. These AND gate 37 to 40 output logical products of the respective input signals, that is, the aforementioned control signals Sig 3 to Sig 6, shown at K to N in FIG. 9.

That is, the output signal Sig 3 of the AND gate 37 is a pulse signal going high (H) only for one clock pulse duration at each falling of the recording signal Sig 0, while the output signal Sig 4 of the AND gate 38 is a pulse signal going high (H) only for one clock pulse duration at each rising of the recording signal Sig 0. The output signal Sig 5 of the AND gate 39 is a pulse signal having a number of pulses associated with the signal width of the low level (L) of the recording signal Sig 0, while the output signal Sig 6 of the AND gate 40 is a pulse signal having a number of pulses associated with the pulse width of the high level (H) of the recording signal Sig 0.

Hence, the control signal generating circuit 20 outputs the aforementioned control signals Sig 1 to Sig 6 from the aforementioned recording signals Sig 0 and clock pulse CK.

Figure 10:
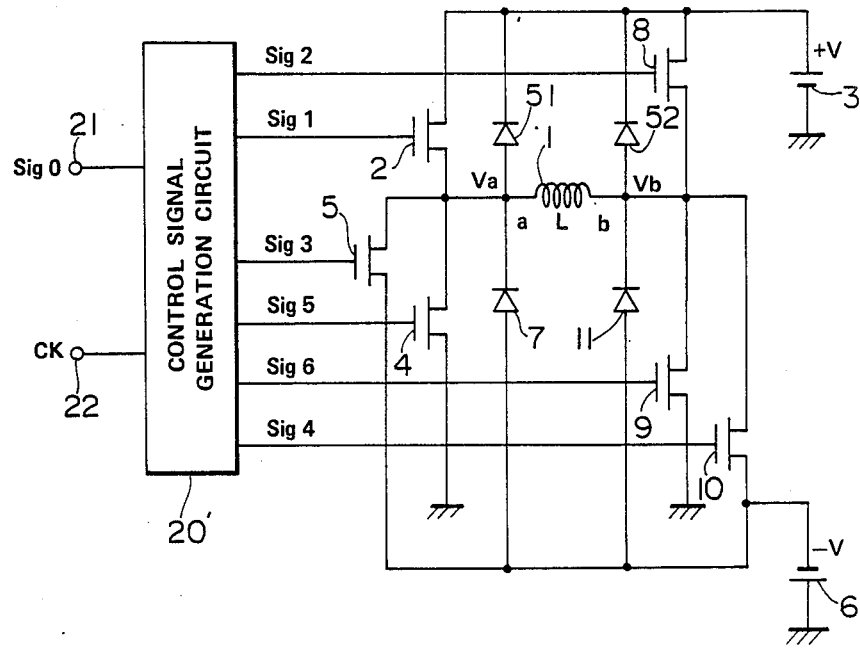
FIG. 10 is a circuit diagram showing the construction of a magnetic head driving circuit according to a second embodiment of the present invention.
Figure 11A:
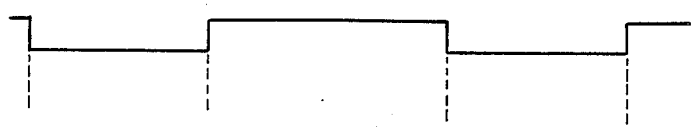
FIG. 11, consisting of (A)–(H), is a time chart for understanding the operation of the second embodiment of the magnetic head driving circuit.
Figure 11B:
Figure 11C:
Figure 11D:
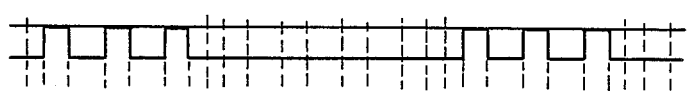
Figure 11E:
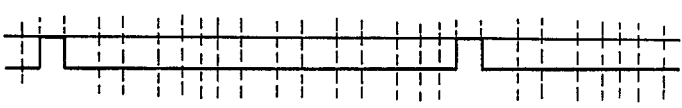
Figure 11F:
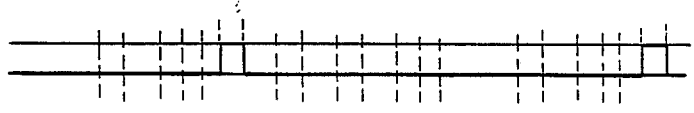
Figure 11G:
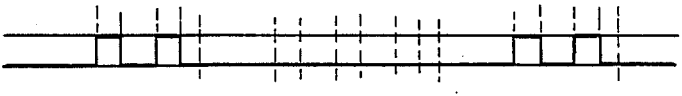
Figure 11H:
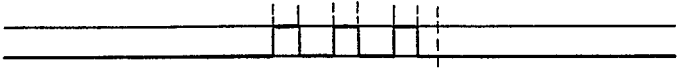
Figure 13A:
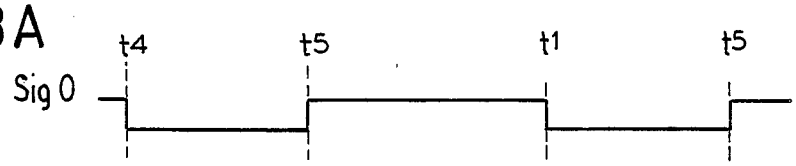
FIG. 13, consisting of (A)–(L), is a time chart for understanding the operation of the third embodiment of the magnetic head driving circuit.
Figure 13B:
Figure 13C:
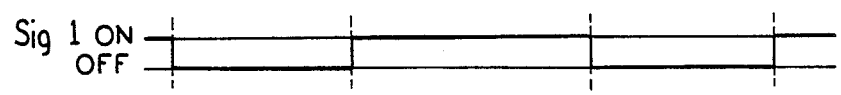
Figure 13D:
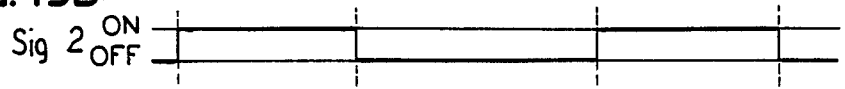
Figure 13E:
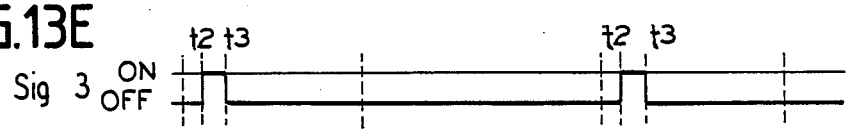
Figure 13F:
Figure 13G:
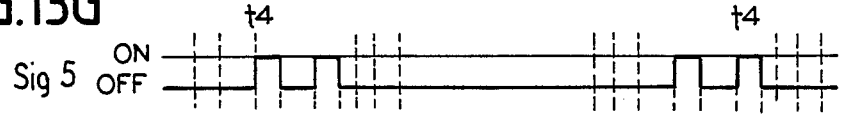

FIG. 10 shows a magnetic head drive circuit according to a second embodiment of the present invention.

In this figure, the one end or point a of the head coil 1 is connected to a positive power source via diode 51. The other end or point b of the heat coil 1 is connected via diode 52 to the positive source. The drive circuit of the present embodiment is otherwise the same as that of the preceding embodiment and hence the same numerals are affixed in FIG. 10 to the same circuit components as those used in FIG. 6 and the corresponding description is omitted.

To the switching elements 2, 8, 5, 10, 4 and 9 of the present magnetic head drive circuit, there are supplied control signals Sig 1 to Sig 6 shown at C to H in FIG. 11 from the control signal generating circuit 20'. The control signal Sig 1 is in the form of a pulse train occurring during the high (H) level period of the control signal Sig 1 shown at C in FIG. 7. The control signal Sig 2 is in the form of a pulse train occurring during the high (H) level period of the control signal Sig 2 shown at D in FIG. 7. The remaining control signals Sig 3 to Sig 6 are in the form of the same pulse trains as the control signals Sig 3 to Sig 6 shown at E to H in FIG. 7.

The operation of the magnetic head drive circuit is same as that of the preceding first embodiment except that the above control signals Sig 1 and Sig 2 are in the form of pulse trains and the switching elements 2 and 8 are turned on only during the turned-on periods of the switching elements 5, 10, 4 and 9. Hence the present magnetic head drive circuit is able to control the switching elements 2, 8, 5, 10, 4 and 9 in their entirety by pulse trains.

It is to be noted that FET's or transistors may be employed as the switching elements 2, 8, 5, 10, 4 and 9 and that diode 7, 11, 51 and 52 may be omitted by parasitic diodes especially when the FET's are employed.

Figure 12:
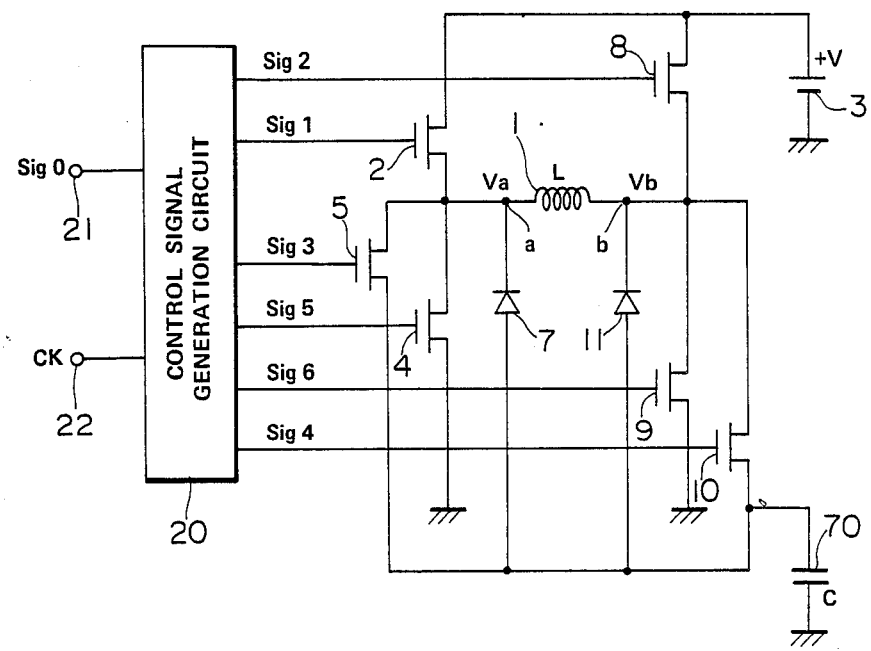
FIG. 12 is a circuit diagram showing a magnetic head driving circuit according to a third embodiment of the present invention.
Figure 13H:
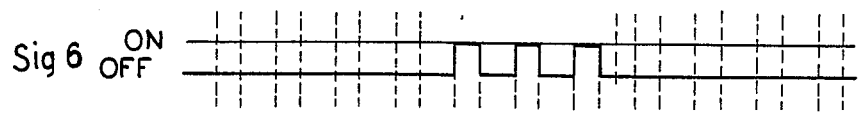
Figure 13I:
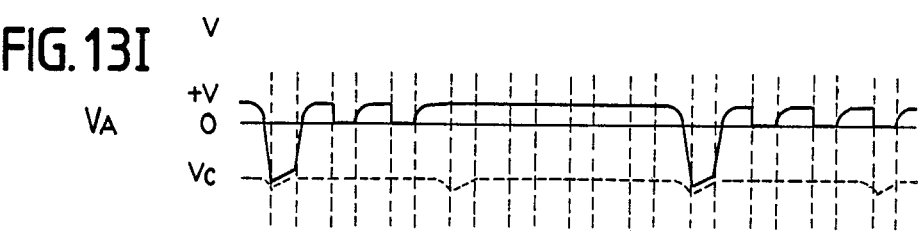
Figure 13J:
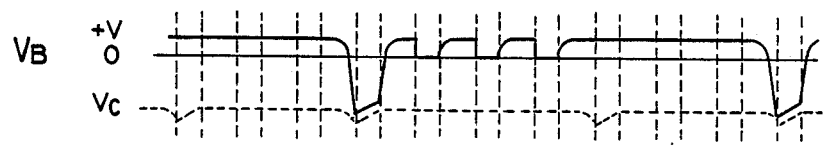
Figure 13K:
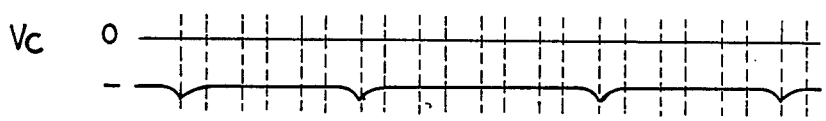
Figure 13L:
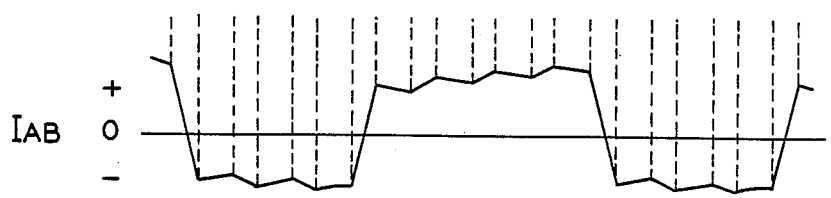

FIG. 12 shows a magnetic head drive circuit according to a third embodiment of the present invention.

In this figure, the one end of a capacitor 70 is connected via switching element 5 to one end or point a of the head coil 1, while being connected via switching element 10 to the other end or point b of the head coil 1. The other end of the capacitor 70 is grounded. Thus the circuit configuration of FIG. 12 is same as that of the preceding first embodiment except that the negative power source shown in FIG. 6 is replaced by the capacitor 70. Hence the same circuit components are indicated by the same reference numerals as those used in FIG. 6 and the corresponding description is omitted for simplicity.

To switching elements 2, 8, 5, 10, 4 and 9 of the magnetic head drive circuit, there are supplied control signals Sig 1 to Sig 6, shown at C to H in FIG. 13, from the control signal generating circuit 20. These control signals Sig 1 to Sig 6 are each a replica of the aforementioned control signals Sig 1 to Sig 6 shown at C to H in FIG. 7.

The potential Va at one end or point a of the head coil 1 is shown at I in FIG. 13. The potential Vb at the other end or point b of the head coil 1 is shown at J in FIG. 13. The potential Vc of the capacitor 70 is shown at K in FIG. 13 and also at I and J in FIG. 13 in broken lines. The current Iab in the head coil 1 is shown at L in FIG. 13.

The potential Va at point a is decreased acutely at the falling of the recording signal Sig 0, that is, at the timing $t_1$ in FIG. 13, as in the magnetic head drive circuit of the preceding first embodiment, since the electrical charges are moved at this timing from the point a to the point b on account of the flyback of the inductance L of the head coil 1. Since the electrical charges of the capacitor 70 are shifted at this time via diode 7 to the head coil 1, the capacitor 70 is at a considerably negative potential.

When the switching element 5, to which the aforementioned control signal sig 3 is supplied, is turned on at the timing of $t_2$, the capacitor 70 continues to be charged, until the capacitor 70 is connected to the positive power source 3 via head coil 1 and the switching elements 5 and 8 and the switching element 5 is turned off at the timing $t_3$. With the switching element 5 turned off, the potential prevailing at this time is maintained in the capacitor 70.

The potential Vb at the point b is decreased actuately at the rising of the recording signal Sig 0, that is, at the timing shown at $t_5$ in FIG. 13, since the electrical charges are moved at this timing from the point b to the point a on account of the flyback of the inductance L of the head coil 1. Since the electrical charges of the capacitor 70 are shifted at this time via diode 11 to the head coil 1, the capacitor 70 is again at a considerably negative potential.

Thus the present magnetic head drive circuit may be driven by a single power source, since the capacitor 70 performs approximately the same operation as that of the negative power source 6 of the preceding first embodiment (it is noted that there are two power sources if the ground potential is thought of as a separate power source).

It will be noted FET's or transistors may also be used as the switching elements 2, 8, 5, 10, 4 and 9 and the diodes 7 and 11 may be omitted by parasitic diodes, especially when the FET's are employed as the aforementioned switching elements 5 and 10.

What is claimed is:

1. A magnetic head drive circuit comprising three power sources presenting respective different potentials for supplying the current to a coil of a magnetic head adapted for performing an opto-magnetic recording, a switching element adapted for commutatingly connected each of said power sources to one end of said coil, and a switching element adapted for commutatingly connecting each of said power sources to the other end of said coil, each of said switching elements being actuated on the basis of a recording signal and said power sources presenting the respective different potentials being commutatingly connected too both ends of said coil at a time of magnetic field inversion generated by said magnetic head during recording is larger than the potential difference at a time of generation of a stationary magnetic field generated by said magnetic head when recording, and comprising drive control means for reciprocally actuating respective switching elements interposed between a power source of three said power sources affording a first potential and the coil of the magnetic head by control signals having pulse widths associated with the recording signal, actuating respective switching elements interposed between said coil and a power source of three said power sources affording a second potential for a predetermined period during said magnetic field inversion, and for actuating the respective switching elements between said coil and a power source of three said power sources affording an intermediate potential by said control signals composed of pulse trains having a number of pulses associated with the recording signal.

2. A magnetic head drive circuit according to claim 1 wherein said drive control means is adapted for reciprocally actuating respective switching elements interposed between the power sources affording a highest potential and the coil of the magnetic head by control signals having pulse widths associated with the recording signal, actuating respective switching elements interposed between the power sources affording a lowest potential and said coil for a predetermined period during said magnetic field inversion and for actuating respective switching elements interposed between the power sources affording the intermediate potential and said coil by control signals in the form of pulse trains each having a number of pulses associated with the recording signal.

3. A magnetic head drive circuit according to claim 1 wherein one of said switching elements and a reverse biased diode are connected in parallel between the coil of the magnetic head and the power source affording the highest potential.

4. A magnetic head drive circuit according to claim 1 wherein each of the respective switching elements is formed 5. A magnetic head drive circuit comprising three power sources representing respective different potentials for supplying the current to a coil of a magnetic head adapted for performing an opto-magnetic recording, a switching element adapted for commutatingly connecting each of said power sources to one end of said coil, and a switching element adapted for commutatingly connecting each of said power sources to the other end of said coil, each of said switching elements being actuated on the basis of a recording signal and said power source representing the respective different potential being commutatingly connected to both ends of said coil at a time of magnetic field inversion generated by said magnetic head during recording is larger than the potential difference at a time of generation of a stationary magnetic field generated by said magnetic head when recording, and comprising drive control means for reciprocally actuating respective switching elements interposed between a power source of three said power sources affording a first potential and the coil of the magnetic head by control signals in the form of pulse trains each having a number of pulses associated with the recording signal, actuating respective switching elements interposed between said coil and a power source of three said power sources affording an intermediate potential by control signals in the form of pulse trains each having a number of pulses associated with the recording signal.

6. A magnetic head drive circuit according to claim 5 wherein said drive control means is adapted for actuating respective switching elements interposed between a power source of three said power sources affording highest potential and the coil of the magnetic head by control signals in the form of pulse trains each having a number of pulses associated with the recording signal, actuating respective switching elements interposed between a power source of three said power sources affording a lowest potential and said coil for a predetermined period during magnetic field inversion and for actuating respective switching elements between a power source of three said power sources affording an intermediate potential and said coil by control signals in the form pulse trains each having a number of pulses associated with the recording signal.

7. A magnetic head drive circuit according to claim 5 wherein one of said switching elements and a reverse biased diode are connected in parallel between both of the magnetic head and the power source affording the lowest potential, and wherein one of said switching elements and a forward biased diode are connected in parallel between said coil and the power source affording the highest potential.

8. A magnetic head drive circuit according to claim 5 wherein each of the switching elements is formed by a field effect transistor.

9. A magnetic head drive circuit according to any one of claims 1 and 3 to 9 wherein one of three said power sources presenting said intermediate potential affords a ground potential.

10. A magnetic head drive circuit according to claim 9 wherein any one of three said power sources which affords the highest potential or the lowest potential is formed as a capacitor.

* * * * *